(12) United States Patent
Ikeda

(10) Patent No.: US 8,891,104 B2
(45) Date of Patent: Nov. 18, 2014

(54) SECURE PRINTING FROM CLOUD PRINT SERVER BY SUSPENDING PRINT JOB WITH VALID PIN CODE AND REQUESTING USER PIN CODE WHEN REACQUIRING JOB LIST

(71) Applicant: Canon Kabushiki Kaisha, Tokyo (JP)

(72) Inventor: Atsushi Ikeda, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 13/656,937

(22) Filed: Oct. 22, 2012

(65) Prior Publication Data

US 2013/0100480 A1    Apr. 25, 2013

(30) Foreign Application Priority Data

Oct. 25, 2011 (JP) .................................. 2011-234199

(51) Int. Cl.
  *G06F 3/12* (2006.01)
  *G06F 15/02* (2006.01)
  *G06K 15/02* (2006.01)
  *G06K 15/00* (2006.01)

(52) U.S. Cl.
  CPC .......... *G06K 15/1822* (2013.01); *G06F 3/1222* (2013.01); *G06K 15/405* (2013.01); *G06F 3/1292* (2013.01); *G06F 3/1238* (2013.01); *G06K 15/4095* (2013.01)
  USPC ......................................... 358/1.14; 358/1.15

(58) Field of Classification Search
  None
  See application file for complete search history.

(56) References Cited

U.S. PATENT DOCUMENTS

| 2009/0080022 A1* | 3/2009 | Tsutsumi ..................... 358/1.15 |
| 2009/0153901 A1* | 6/2009 | Imamura et al. ............. 358/1.15 |
| 2010/0182640 A1* | 7/2010 | Daigo .......................... 358/1.15 |

FOREIGN PATENT DOCUMENTS

JP    2002-370407 A    12/2002

* cited by examiner

Primary Examiner — Scott A Rogers
Assistant Examiner — Richa Mishra
(74) Attorney, Agent, or Firm — Canon USA, Inc., IP Division

(57) ABSTRACT

A printer performing printing for a cloud print server that provides a print service includes an acquisition unit, a determination unit, a flag enabling unit, a request unit, and a control unit. The acquisition unit acquires a job list from the cloud print server. The determination unit determines presence/absence of a job including a valid PIN code. A valid PIN code indicates that the job is to be secure printed. The flag enabling unit does not enable a suspension flag in response to determining the absence of the job, and enables the suspension flag in response to determining the presence of the job. The request unit requests input of a PIN code if the suspension flag is enabled when the acquisition unit acquires the job list again. The control unit controls printing of the job to be secure printed based on the input PIN code.

20 Claims, 10 Drawing Sheets

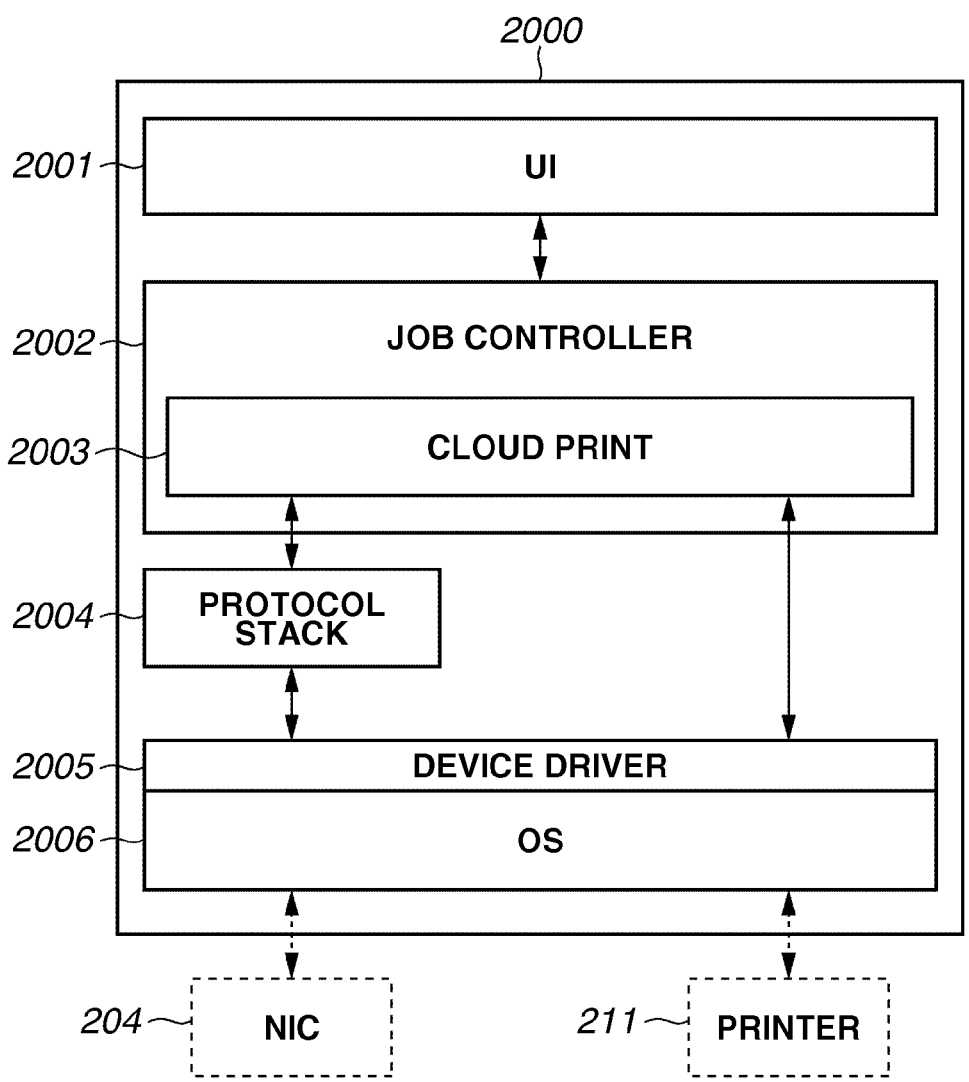

SECURE PRINTING FROM CLOUD PRINT SERVER BY SUSPENDING PRINT JOB WITH VALID PIN CODE AND REQUESTING USER PIN CODE WHEN REACQUIRING JOB LIST

BACKGROUND OF THE INVENTION

1. Field of the Invention

The present invention relate to a printer, a control method, and a storage medium.

2. Description of the Related Art

Some image forming apparatuses have a function called confidential printing or secure printing. The function is intended to perform printing after successful authentication is carried out in order to prevent the printing from starting in a place out of sight and information from leaking to a third party when printing a highly confidential document. A technique includes adding a password to print data and holding the password-added print data in an image forming apparatus before making prints. Such a technique needs a large-capacity storage unit. Japanese Patent Application Laid-Open No. 2002-370407 discusses a method for implementing the function with less memory.

Cloud print services have recently started to be used. Cloud print services are attracting attention because printing can be performed from tablet terminals without a printer driver.

However, a system that can perform secure printing by using the current cloud print services has yet to be constructed. For example, while a password may be added to print data by using some kind of device, the conventional configuration of holding the password-added print data in an image forming apparatus is difficult to implement in a low memory capacity apparatus having no hard disk.

Even when applying the method discussed in Japanese Patent Application Laid-Open No. 2002-370407, the image forming apparatus needs to store job numbers, passwords, and first-page data of a plurality of jobs. Again, such a system is difficult to implement in an apparatus having no hard disk.

SUMMARY OF THE INVENTION

The present invention is directed to the implementation of secure printing by cloud printing without changing the existing protocols of the cloud printing. Here, the protocols of the cloud print services maybe changed to store only first pages in advance.

According to an aspect of the present invention, a printer capable of performing printing in cooperation with a cloud print server for providing a print service includes an acquisition unit configured to acquire a job list from the cloud print server, a determination unit configured to determine presence or absence of a job including a valid personal identification number (PIN) code based on job information included in the acquired job list, wherein the valid PIN code indicates that the job is to be secure printed, a flag enabling unit configured not to enable a suspension flag in response to determining the absence of the job, and to enable the suspension flag in response to determining the presence of the job, a request unit configured to request input of a PIN code if the suspension flag is enabled when the acquisition unit acquires the job list again after determining the presence or absence of a job including the valid PIN code, and a control unit configured to control printing of the job to be secure printed, acquired from the cloud print server, based on the PIN code input in response to the request of input of a PIN code.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 is a block diagram illustrating a software configuration of the MFP illustrated in FIG. 1.

DESCRIPTION OF THE EMBODIMENTS

Various exemplary embodiments, features, and aspects of the invention will be described in detail below with reference to the drawings.

Figure 1:
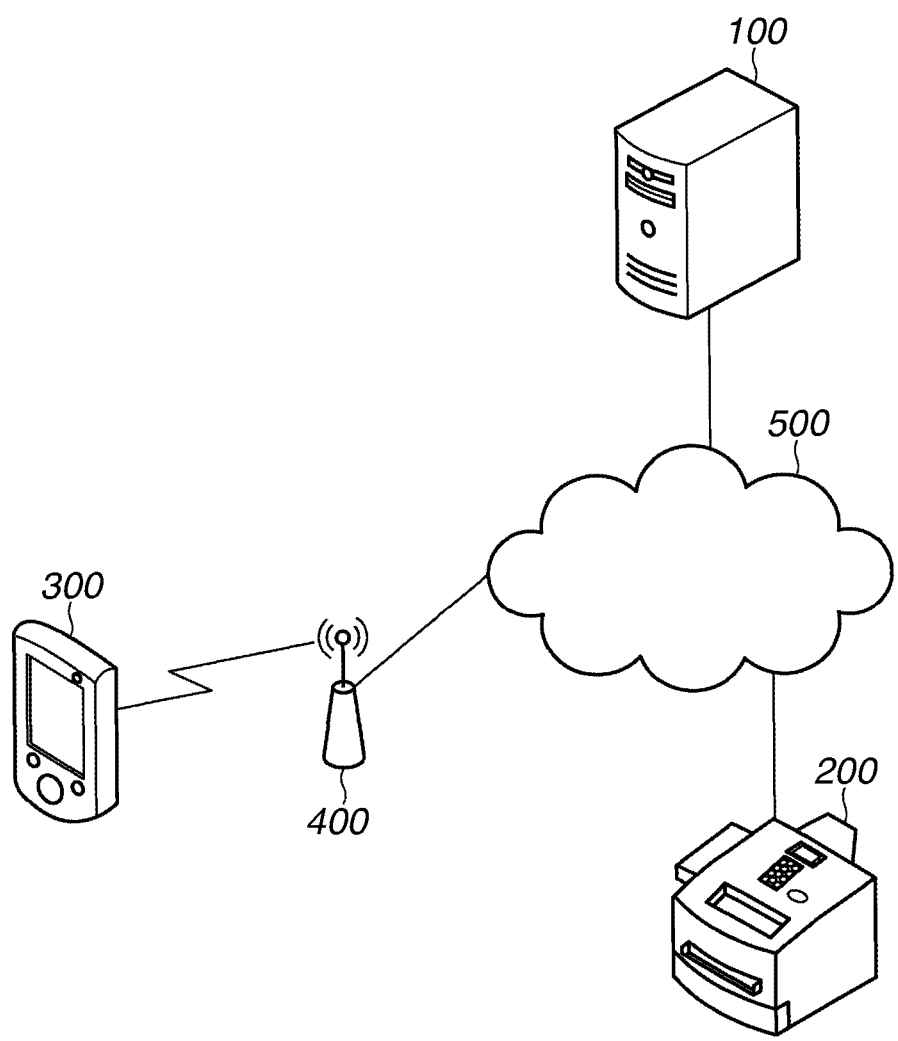
FIG. 1 is a schematic diagram illustrating a use environment of an image forming apparatus (multifunction peripheral (MFP)) according to an exemplary embodiment.

FIG. 1 is a schematic diagram illustrating a use environment of an image forming apparatus according to the present exemplary embodiment. In an example, the image forming apparatus is a multifunction peripheral (MFP).

A cloud print server 100, an MFP 200, and a wireless network router 400 are connected to a network 500. A PDA terminal 300 is connected to the network 500 through the wireless network router 400.

The PDA terminal 300 communicates with the cloud print server 100 by using a predetermined protocol and transmits a print request according to a user's print instruction. Upon receiving the print request from the PDA terminal 300, the cloud print server 100 notifies the MFP 200 of the arrival of a print job. According to the notification from the cloud print server 100, the MFP 200 receives the print job from the cloud print server 100 by using a predetermined protocol and performs printing. The protocols will be outlined later. Web printing is implemented by such cooperation of the MFP 200 and the cloud print server 100.

Figure 2:
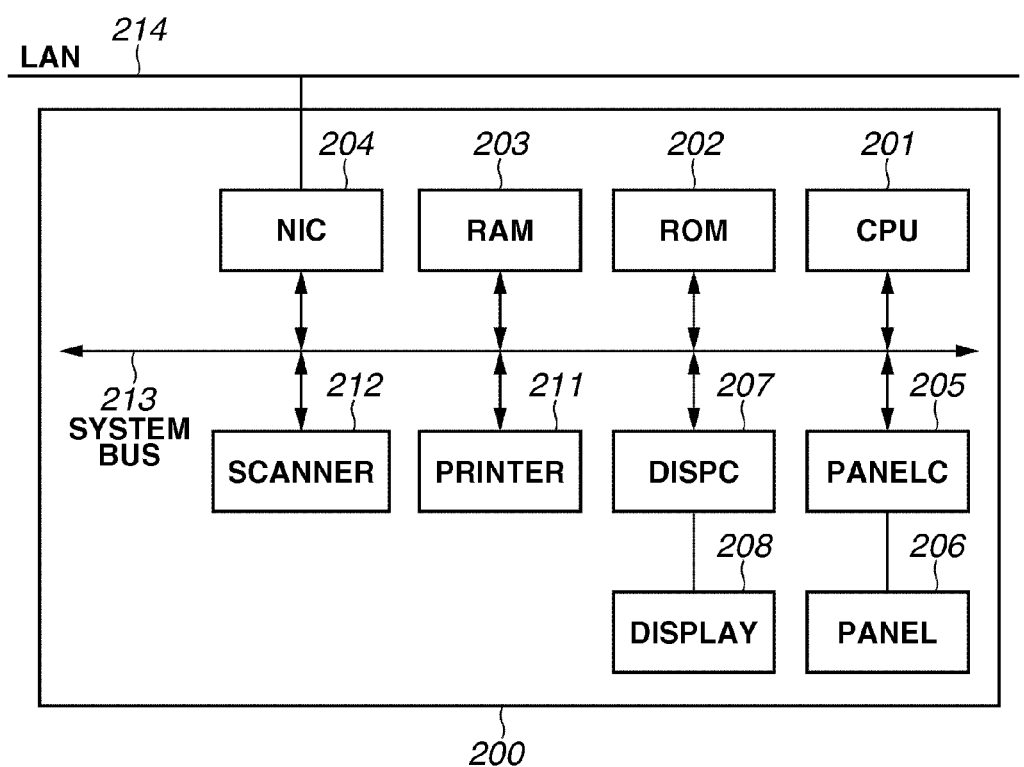
FIG. 2 is a block diagram illustrating a hardware configuration of the MFP illustrated in FIG. 1.

FIG. 2 is a block diagram illustrating the hardware configuration of the MFP 200 illustrated in FIG. 1. In FIG. 2, the MFP 200 includes a central processing unit (CPU) 201, a read-only memory (ROM) 202, a random access memory (RAM) 203, a network interface card (NIC) 204, an external input controller (hereinafter, referred to as PANELC) 205, and various types of buttons or a touch panel (referred to as PANEL) 206. The MFP 200 also includes a display controller (referred to as DISPC) 207 and a display 208. The MFP 200 further includes a printer unit (referred to as PRINTER) 211 and a scanner unit (referred to as SCANNER) 212.

The CPU 201 performs centralized control over the devices connected to a system bus 213 and executes firmware modules stored in the ROM 202. The firmware modules include at least two or more modules. The firmware modules can be updated one by one. Based on the firmware modules as a control program, the CPU 201 performs processing, or a control method for controlling a printer, illustrated by a flowchart to be described later. The RAM 203 functions as an image storage location as well as a main memory and a work area of the CPU 201.

The PANELC 205 controls an instruction input from the PANEL 206 which is mounted on the MFP 200. The DISPC 207 controls drawing on the display 208. The NIC 204 bidirectionally exchanges data with a file server (not illustrated) and the cloud print server 100 illustrated in FIG. 1 through a local area network (LAN) 214. The PRINTER 211 forms an image on a recording sheet by an electrophotographic process. The SCANNER 212 reads an image printed on a recording sheet. The SCANNER 212 includes an optional auto document feeder (not illustrated) and can automatically read a plurality of documents.

FIG. 10 is a block diagram illustrating the software configuration of the MFP 200 illustrated in FIG. 1. Software 2000 according to the present exemplary embodiment includes modules such as a user interface (UI) 2001, a job controller 2002, and an operating system (OS) 2006. The software 2000 also includes a module of a protocol stack 2004. The OS 2006 is combined with a device driver 2005 which mediates transactions between other modules, tasks, and the hardware illustrated in FIG. 2, including the PRINTER 211. The job controller 2002 includes a task of a cloud print 2003. The modules and tasks are constituted by respective programs stored in the ROM 202 illustrated in FIG. 2. The CPU 201 executes the programs to implement the modules and tasks.

The OS 2006 adjusts schedules for the modules and tasks to occupy the CPU 201 illustrated in FIG. 2 and manages the operation of the entire software 2000. The UI 2001 draws a screen on the display 206 through the DISPC 207 and accepts inputs from the PANEL 206 through the PANELC 205. The job controller 2002 accepts copy, print, and other requests, and controls the MFP 200 in cooperation with the other modules to perform operations based on the requests. The protocol stack 2004 controls network protocols such as Transmission Control Protocol/Internet Protocol (TCP/IP), Extensible Messaging and Presence Protocol (XMPP), and Hypertext Transfer Protocol (HTTP), and implements communications with the MFP 200 and the cloud print server 100 through the network 500. The cloud print 2003 is a task including print control processing to be described later. The cloud print 2003 executes a sequence for cloud printing to be described later to perform printing by using the PRINTER 211 according to a job notification received through the NIC 204.

Figure 3:
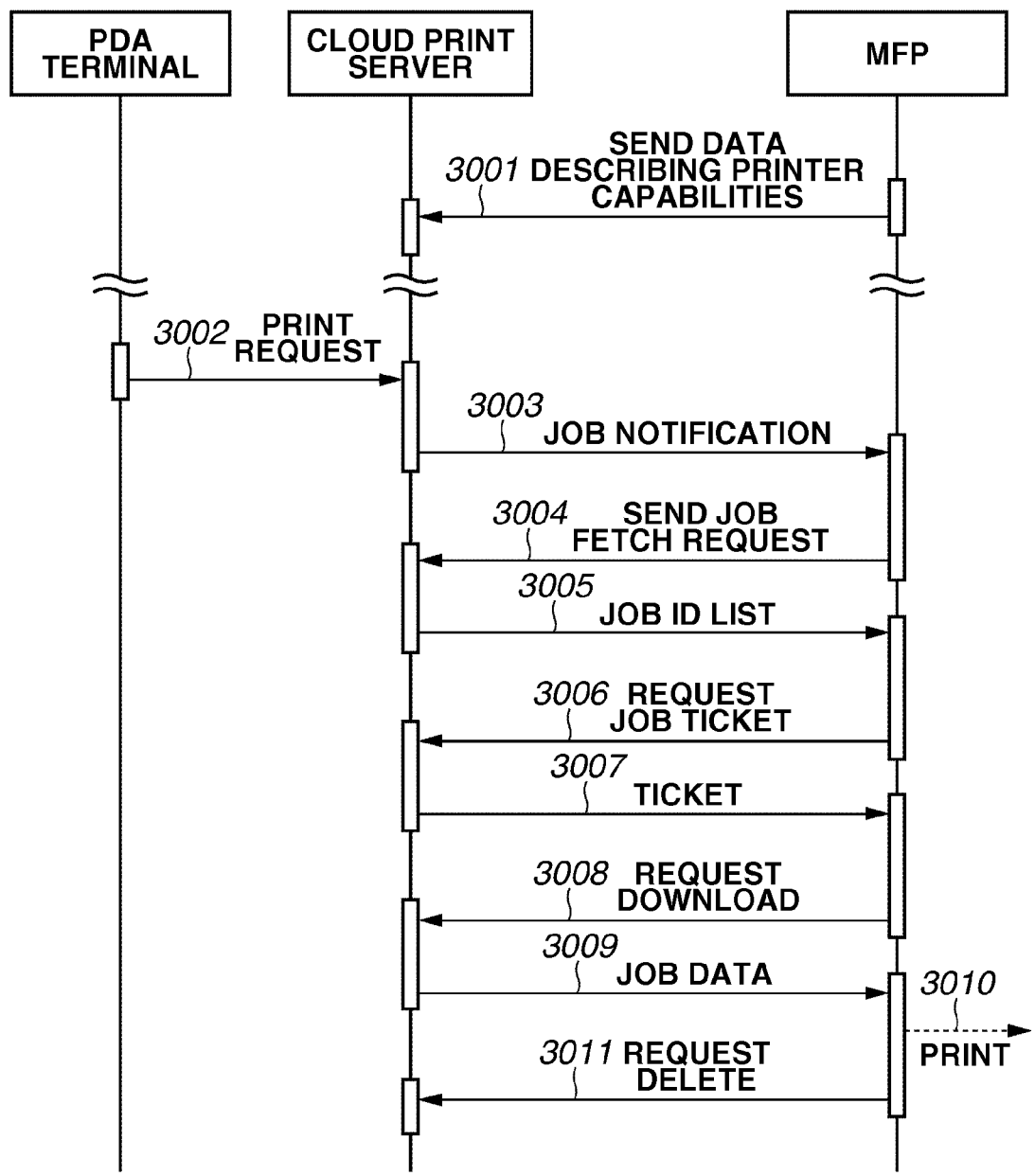
FIG. 3 is a diagram illustrating an example of a typical sequence for cloud printing.
Figure 4:
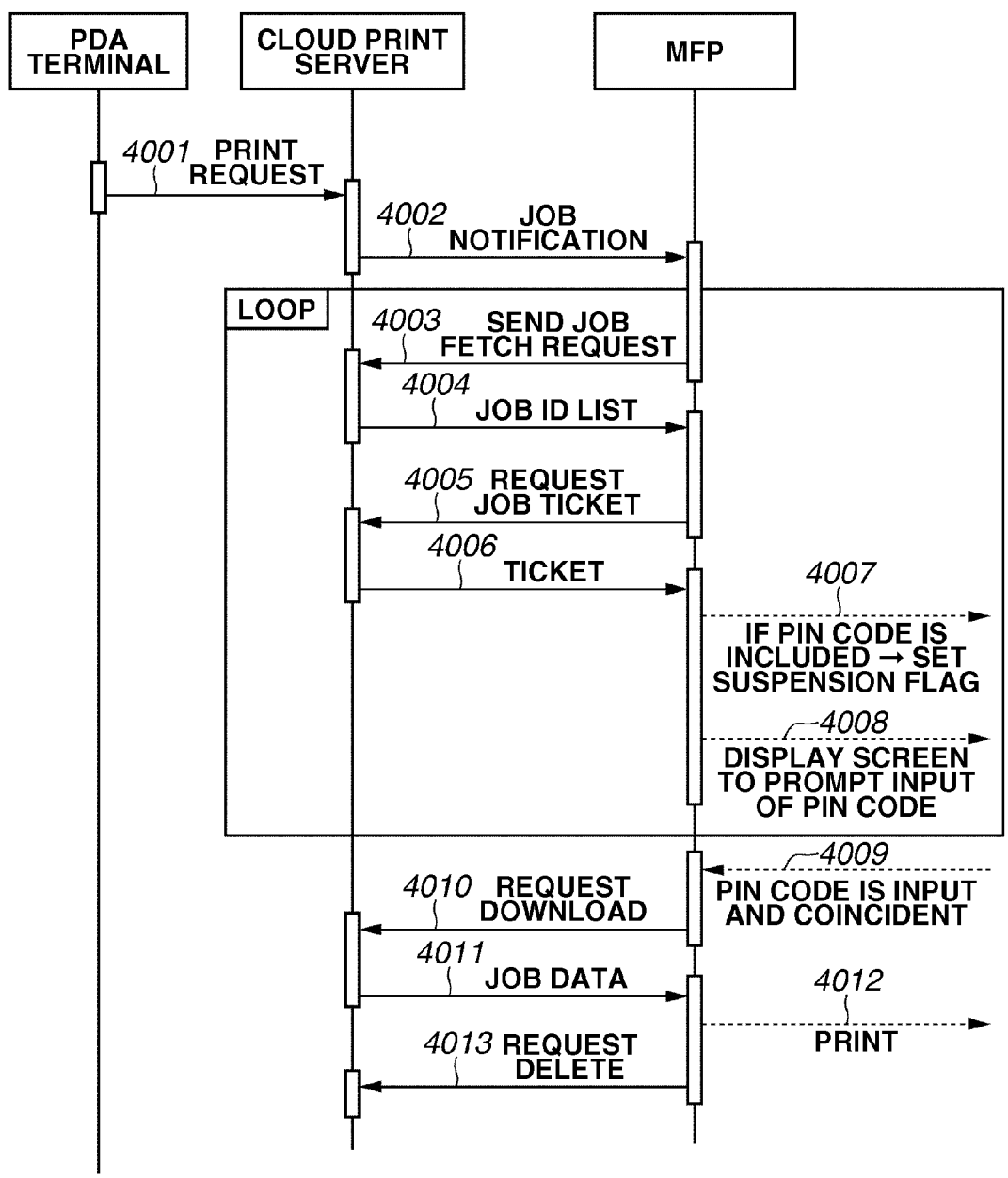
FIG. 4 is a diagram illustrating an example of a sequence for printing a secure job by cloud printing.

FIG. 3 is a diagram illustrating an example of the sequence for cloud printing assumed in an exemplary embodiment. In particular, the first exemplary embodiment describes a sequence for cloud printing based on the Google Cloud Print which has been released by Google (registered trademark). FIG. 4 is a diagram illustrating an example of a sequence for printing a secure job by cloud printing. The first exemplary embodiment implements secure printing, which is not expected of the Google Cloud Print, without changing the specifications of the Google Cloud Print but strictly conforming to the specifications.

Figure 5:
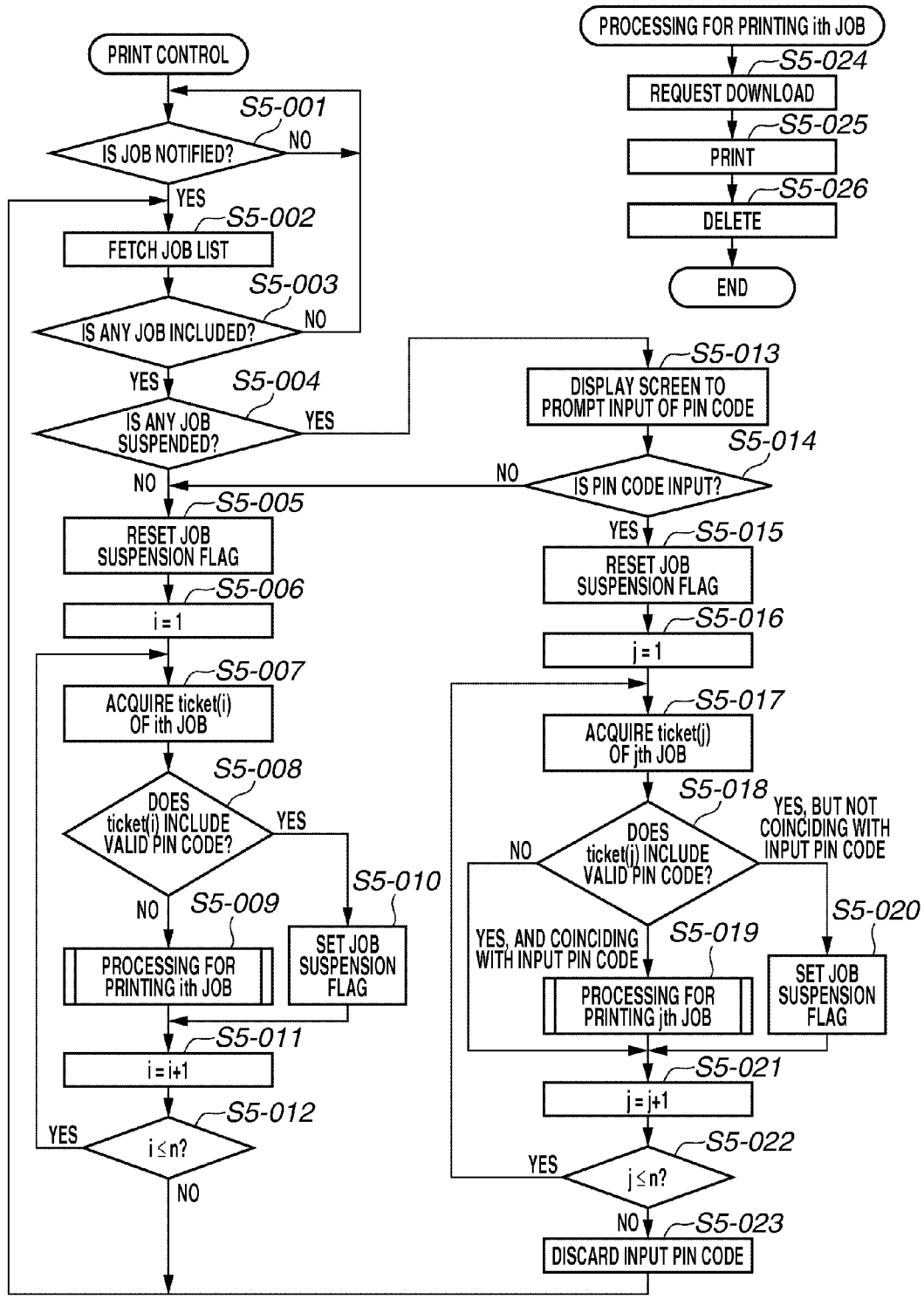
FIG. 5 is a flowchart illustrating the procedure of the print control processing according to the present exemplary embodiment.

FIG. 5 is a flowchart illustrating the procedure of the print control processing according to the present exemplary embodiment. The CPU 201 executes the program that constitutes the cloud print 2003 illustrated in FIG. 10, and the resulting various types of units perform the processing of FIG. 5. In an exemplary embodiment, the processing is assumed to be performed by the job controller 2002. Referring to FIGS. 3, 4, and 5, the printing procedure according to the present exemplary embodiment will be described in detail below.

The cloud printing assumed in an exemplary embodiment needs registering the capabilities of a printer into the cloud print server 100 in advance. The MFP 200 according to the present exemplary embodiment sends data describing printer capabilities to the cloud print server 100 according to a user's operation on the screen of the UI 2001 illustrated in FIG. 10 (processing 3001 of FIG. 3). The printer capabilities are described in an Extensible Markup Language (XML) format. There are predetermined keywords for expressing specific printer capabilities. Such keywords can be used to register capabilities including supported sheet sizes, the presence or absence of a two-sided printing function, and the presence or absence of a Nup function.

Private keywords may be additionally defined. The MFP 200 according to the present exemplary embodiment defines a keyword that represents a PIN code, and registers the capability of interpreting a PIN code into the cloud print server 100 in advance. The PIN code is not limited to a number string and may be a character string, a symbol string, or a combination of these. The cloud print server 100 then provides a print setting screen with an additional item for a PIN code. The registration of the PIN code as printer information is one of the characteristics of an exemplary embodiment.

Figure 6:
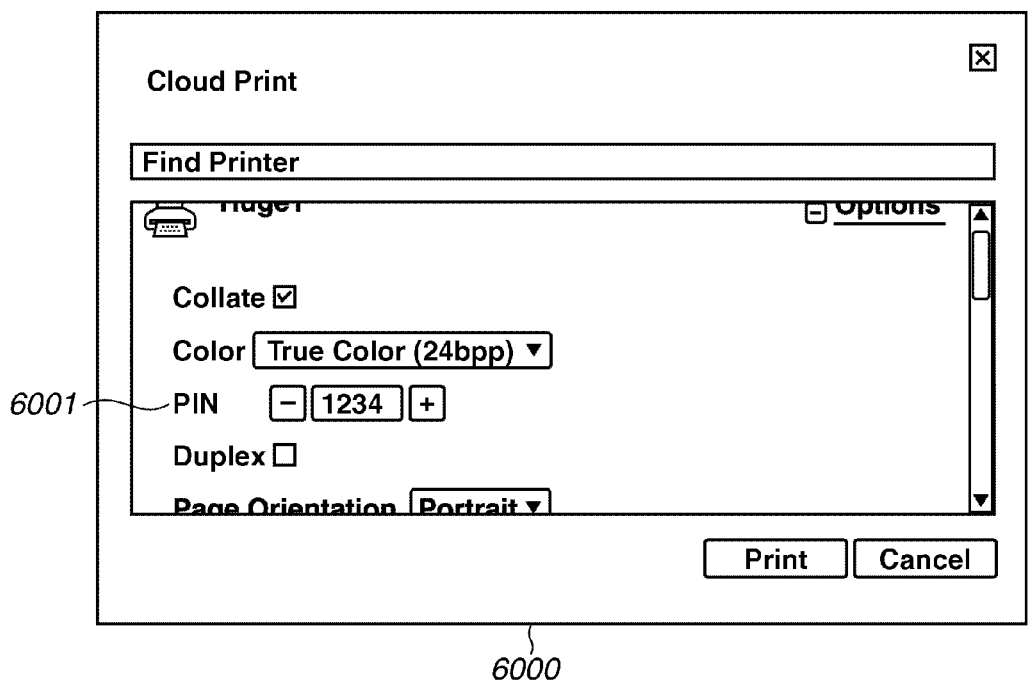
FIG. 6 is a diagram illustrating an example of a personal digital assistant (PDA) terminal's screen that is displayed to the user when making a print request according to the present exemplary embodiment.

The user can make a print request to the previously registered printer (3002 illustrated in FIG. 3). FIG. 6 illustrates an example of the PDA terminal's screen that is displayed to the user when making a print request. For a normal print request, the user specifies 0 as an invalid PIN code to the item 6001 illustrated in FIG. 6. The requested cloud print server 100 notifies the MFP 200, the registered printer, of the submission of a job by XMPP (3003). The job notification is passed through the protocol stack 2004 illustrated in FIG. 10, and detected in step S5-001 illustrated in FIG. 10.

In step S5-001, if the job controller 2002 detects the job notification (Yes in step S5-001), the job controller 2002 proceeds to step S5-002. An item "enable secure printing" may be provided separately and the job controller 2002 may have the user input a PIN code when the item is checked. In such a case, whether the PIN code is a valid PIN code may be determined based on the information whether the item "enable secure printing" is checked.

In step S5-002, the job controller 2002 fetches a job ID list or job list. "Fetch" refers to acquiring the job list from the cloud print server 100. The job list includes at least a job ID. Aside from the job ID (s), the job list includes job data on each job and universal resource locator (URL) information indicating the storage location of a job ticket. Such information will be referred to as job information.

The MFP 200 sends a job fetch request to the cloud print server 100 (3004). Upon receiving the job fetch request, the cloud print server 100 sends a job ID list, or job list, including n job IDs to the MFP 200 (3005). Immediately after a request to print a job is made, the job ID list typically includes one job ID (n=1) that is notified in 3001. If another job is requested to be printed during job print processing to be described later or while a job is suspended, the number of job IDs may be more than one (n>1). In step S5-002, the job controller 2002 temporarily stores the acquired job ID list, or job list, into the RAM 203 illustrated in FIG. 2.

In step S5-003, the job controller 2002 determines whether the stored job ID list is empty. If the job ID list is empty (No in step S5-003), the job controller 2002 returns to step S5-001. On the other hand, if the stored job ID list includes one or more IDs (Yes in step S5-003), the job controller 2002 proceeds to step S5-004. In step S5-004, the job controller 2002 determines whether there is a suspended job. Immediately after a normal print request, there is no suspended job yet (No in step S5-004). The job controller 2002 then proceeds to step S5-005.

In step S5-005, the job controller 2002 resets a job suspension flag stored in the RAM 203. In step S5-006, the job controller 2002 sets 1 into an index i. In step S5-007, the job controller 2002 acquires a ticket of the ith job ID included in the temporarily stored job ID list. The MFP 200 issues a request for the ticket of the ith job ID to the cloud print server 100 based on the URL of the job ticket in the job list (3006). The cloud print server 100 in response sends the ticket of the designated job ID (3007). Like printer capabilities, the ticket is written in XML, with keywords common with the printer capabilities. The PIN code input from the item 6001 illustrated in FIG. 6 is passed by using a privately defined keyword.

Figure 7:
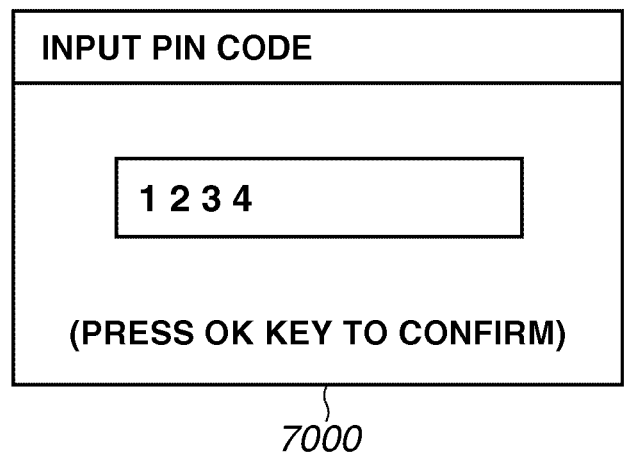
FIG. 7 is a diagram illustrating an example of a screen for inputting a PIN code according to the present exemplary embodiment.

In step S5-008, the job controller 2002 determines whether the acquired ticket includes a valid PIN code which indicates that the job is one to be secure printed. For normal printing, the ticket includes an invalid PIN code of 0 (No in step S5-008). In such a case, the job controller 2002 proceeds to step S5-009 without enabling the suspension flag to be described later. Unlike an invalid pin code "0," a valid PIN code is a security code as illustrated in FIG. 7. It should be noted that the information for representing an invalid PIN code need not necessarily be "0." Information that is included in the job ticket when the item "enable secure printing" is checked may be said to be a kind of a valid pin code.

Step S5-009 is a subroutine for print processing. Step S5-009 includes steps S5-024, S5-025, and S5-026. In step S5-024, the MFP 200 issues a download request to the cloud printer server 100 for the job data of the job ID (3008). Upon receiving the request, the cloud print server 100 sends the job data to the MFP 200 (3009). In step S5-025, the MFP 200 prints the received job data (3010). After the printing ends, the job controller 2002 proceeds to step S5-026. In step S5-026, the job controller 2002 requests the cloud print server 100 to delete the printed job (3011). This ends the subroutine for print processing. After the end of the subroutine, the job controller 2002 proceeds to step S5-011 to add one to the index i. The job controller 2002 proceeds to step S5-012. Since the job is deleted in step S5-026, the deleted job will not be included in any job list subsequently acquired.

In step S5-012, the job controller 2002 determines whether the job ID list temporarily stored in step S5-002 includes any unexamined ID. If the job ID list includes a plurality of job IDs, the job controller 2002 repeats steps S5-007 to S5-011 until all the job IDs are examined. If all the job IDs have been examined (No in step S5-012), the job controller 2002 returns to step S5-002. If there is only one job (n=1; No in step S5-012), the job controller 2002 returns to step S5-002 to acquire a job list again. If no new print request has been made, then in step S5-002, the job controller 2002 acquires an empty job ID list. The job controller 2002 returns to step S5-001 via step S5-003.

Now, suppose there is a job that includes a valid PIN code which indicates that the job is one to be secure printed. To perform secure printing, the user specifies a valid PIN code other than 0 from the item 6001 illustrated in FIG. 6 (4001). FIG. 6 illustrates an example where "1234" is input as the PIN code. Like 3003 illustrated in FIG. 3, the requested cloud print server 100 notifies the MFP 200, the registered printer, of the submission of a job by XMPP (4002).

The subsequent processing is in part the same as the foregoing. After the detection of the job notification in step S5-001 illustrated in FIG. 5 (Yes in step S5-001), the job controller 2002 performs steps S5-002 to S5-007. As a result, a fetch request for the job ID list is made (4003), the job ID list is sent back (4004), a ticket is requested (4005), and the ticket of the designated job is sent back (4006).

Next, the job controller 2002 proceeds to step S5-008. If "1234" is input as the PIN code to the item 6001 illustrated in FIG. 6, the acquired ticket includes the valid PIN code "1234" (Yes in step S5-008). The job controller 2002 then proceeds to step S5-010. In step S5-010, the job controller 2002 sets and enables the job suspension flag stored in the RAM 203 (4007). The job controller 2002 then performs steps S5-011 and S5-012 as described above, and returns to step S5-002. At this point in time, the suspension flag is enabled.

In step S5-002, the job controller 2002 acquires and temporarily stores the job ID list that includes at least the ID of the one suspended job unless the suspended job is deleted from the PDA terminal 300. The job controller 2002 then proceeds up to step S5-004. Note that the job controller 2002 having performed steps S5-002 to S5-012 returns to step S5-002. More specifically, the job controller 2002 is configured to acquire the job list again after the information about the PIN code of each job included in the previous job list is examined, i.e., after certain time has lapsed since the acquisition of the previous job list. An exemplary embodiment implements secure printing without changing the specifications of the cloud print server 100. Since the job list is acquired at regular intervals, the latest job status can be grasped and appropriate secure printing can be carried out at each point of time that the acquisition is performed.

For example, suppose that the cloud print server 100 generates three suspended jobs before a cancel instruction is given for one of the suspended jobs. The MFP 200 enables the suspension flag and acquires the job list again. The MFP 200 enters the processing of secure printing based on the suspension flag. One of the characteristics of an exemplary embodiment lies in that the MFP 200 here displays a screen for inputting a PIN code to be described later based on the latest job list, whereby the secure printing is performed according to the latest job status. Aside from the foregoing characteristic, the MFP 200 according to an exemplary embodiment does not store the PIN code of each job. Rather, the MFP 200 only stores the job suspension flag. Therefore, as another character, an amount of memory use is reduced. In other words, an exemplary embodiment effectively achieves both the characteristics at the same time.

Figure 8:
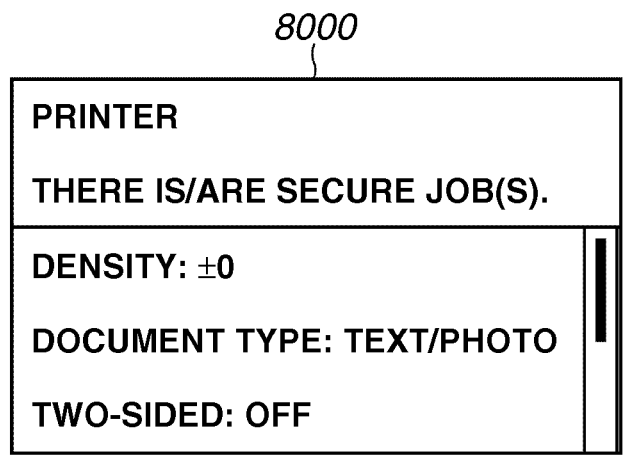
FIG. 8 is a diagram illustrating an example of a screen for prompting PIN code input according to the present exemplary embodiment.

In step S5-004, the job controller 2002 detects the job suspension flag set in step S5-010 (Yes in step S5-004), and proceeds to step S5-013. In step S5-013, the job controller 2002 requests the UI 2001 illustrated in FIG. 10 to display a screen for prompting PIN code input on the display 208 (4008). FIG. 8 illustrates an example of the screen for prompting the PIN code input according to the present exemplary embodiment. In step S5-014, the job controller 2002 determines whether the user has operated the PANEL 206 of the MFP 200 to input a PIN code through the UI 2001. If the PIN code is input (Yes in step S5-014), the job controller 2002 proceeds to step S5-015. If not (No in step S5-005), the job controller 2002 returns to step S5-005. FIG. 7 illustrates an example of the screen for inputting the PIN code according to the present exemplary embodiment.

The processing of steps S5-015 to step S5-017 is similar to that of steps S5-005 to S5-007. In step S5-018, the job controller 2002 compares the PIN code that is input according to the request and the PIN code that is included in the ticket of the jth job ID acquired in step S5-017. If the acquired ticket includes no valid PIN code (No in step S5-018), the job controller 2002 skips to step S5-021. In other words, the job controller 2002 controls the MFP 200 not to acquire the job from the cloud print server 100 or print the job. If the two PIN codes coincide with each other (Yes, and coinciding with the input PIN code in step S5-018), the job controller 2002 proceeds to step S5-019. In step S5-019, the job controller 2002 acquires the job from the cloud print server 1 in order to perform the processing for printing the jth job.

At the time of job acquisition, the job controller 2002 identifies the URL of the job data pertaining to the job to be acquired from within the job list, and acquires the job based on the identified URL of the job data. If the two PIN codes do not coincide with each other (Yes, but not coinciding with the input PIN code in step S5-018), the job controller 2002 proceeds to step S5-020. In step S5-020, the job controller 2002 sets the job suspension flag stored in the RAM 203.

In step S5-021, the job controller 2002 adds one to the index j, and proceeds to step S5-022. In step S5-022, the job controller 2002 performs processing similar to that of step S5-012. More specifically, the job controller 2002 repeats steps S5-017 to S5-021 until all the job IDs have been examined by the determination processing of step S5-022. As a result, all jobs whose tickets include the same PIN code as the input PIN code are printed in step S5-019. If all the job IDs have been examined (Yes in step S5-022), the job controller 2002 proceeds to step S5-023. In step S5-023, the job controller 2002 discards the input PIN code since the input PIN code is no longer needed. The job controller 2002 returns to step S5-002.

Figure 9:
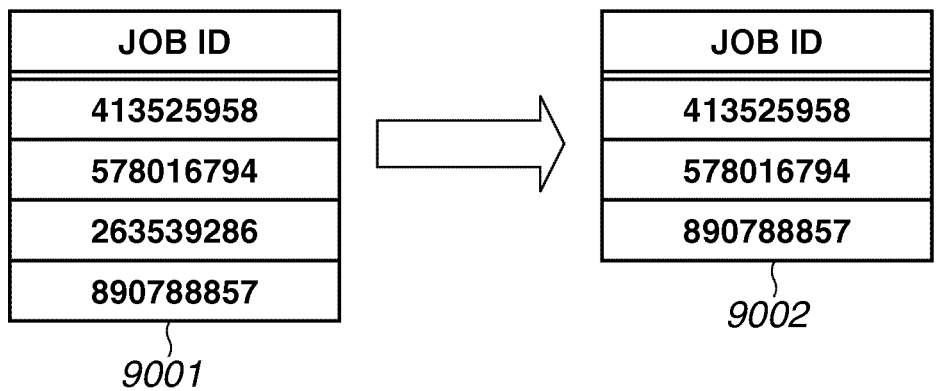
FIG. 9 is a diagram illustrating an example where the job identifier (ID) list acquired and temporarily stored in step S5-002 decreases.

As mentioned above, if another job is requested to be printed during job print processing or while a job is suspended, the IDs included in the fetched job ID list may increase. On the other hand, if a suspended job is cancelled from the PDA terminal 300, the IDs included in the fetched job ID list may decrease. In the present exemplary embodiment, step S5-002 is configured to be performed on a regular basis. This can resolve a discrepancy between the cloud print server 100 and the MFP 200 even if the number of IDs in the job ID list changes. FIG. 9 illustrates an example where the job ID list acquired and temporarily stored in step S5-002 decreases. The job ID list 9001 is an example of the temporarily stored job ID list with four suspended jobs. The job ID list 9002 illustrates an example of the temporarily stored job ID list where the job having an ID "263539286" has been cancelled.

With such a configuration, the MFP 200 according to the present exemplary embodiment can implement secure printing by cloud printing without changing the protocols of the cloud print server 100 that provides print services assumed in an exemplary embodiment. Since only job IDs are temporarily stored, secure printing can be carried out with less memory compared with the conventional techniques.

Other Embodiments

The first exemplary embodiment has been described with the MFP 200 as an example of the image forming apparatus. However, an exemplary embodiment is not limited to an MFP. A single function printer (SFP) without the SCANNER 212 illustrated in FIG. 2 can achieve the same effects. The term "printer" refers to any one of such apparatuses.

In the first exemplary embodiment, step S5-008 is configured to unconditionally acquire tickets. Such a configuration by itself can achieve the intended purpose. However, in view of the network traffic for ticket acquisition, it is desirable to provide a step for reducing the number of times of acquisition. For example, step S5-002 may include comparing the previous job ID list temporarily stored and the job ID list just acquired, and storing the comparison result whether the two coincide with each other. The job controller 2002 then proceeds to step S5-006 if the two job ID lists coincide with other immediately before step S5-005. If not, the job controller 2002 returns to step S-002. Such a configuration can reduce the network traffic.

In the first exemplary embodiment, step S5-018 is configured so that if the acquired ticket includes no valid PIN code (No in step S5-018), the job controller 2002 skips to step S5-021. Thus, when a PIN code is input, the MFP 200 prints jobs that have the coincident PIN code. However, step S5-019 may also be performed if no valid PIN code is included. Such a configuration can also achieve the intended purpose, whereas the print products may include ones that are not to be secure printed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable storage medium may store a program that causes a printer to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-234199 filed Oct. 25, 2011, which is hereby incorporated by reference herein in its entirety.

What is claimed is:

1. A printer capable of performing printing in cooperation with a cloud print server for providing a print service, the printer comprising:
    an acquisition unit configured to acquire a job list from the cloud print server;
    a determination unit configured to determine, based on job information included in the acquired job list, whether the acquired job list includes a job personal identification number (PIN) code that is a valid job PIN code, wherein a valid job PIN code is code that indicates a job associated with the valid job PIN code is to be secure printed;

a flag enabling unit configured to enable a suspension flag to suspend printing of a job in response to determining that a valid job PIN code is included in the acquired job list and configured not to enable the suspension flag in response to determining that an invalid job PIN code is included in the acquired job list;

a request unit configured to request, in a case where the suspension flag is enabled when the job list is reacquired by the acquisition unit from the cloud print server, input of a user PIN code; and a control unit configured to control acquisition of the job to be secure printed due to acquisition of a valid job PIN code and printing of the job to be secure printed based on the input user PIN code.

2. The printer according to claim 1, wherein the control unit is configured to acquire the job from the cloud print server and print the job in a case where the input user PIN code coincides with the valid job PIN code, and not to acquire the job from the cloud print server and print the job in a case where the input user PIN code does not coincide with the valid job PIN code.

3. The printer according to claim 1, wherein in a case where the suspension flag has been enabled by the flag enabling unit and the job list reacquired by the acquisition unit does not include the job information on the job to be secure printed as a result of a user issuing an instruction to the cloud print server to delete the job to be secure printed, (i) the request unit is configured not to request the input of the user PIN code, (ii) the control unit is configured not to print the job, and (iii) the determination unit is configured to perform determination processing again.

4. The printer according to claim 1, wherein, in response to determining that the acquired job list does not include a valid job PIN code, the flag enabling unit is configured not to enable the suspension flag and the control unit is configured to acquire, from the cloud print server, a job pertaining to the job information included in the job list and print the acquired job without requesting the input of the user PIN code.

5. A control method for controlling a printer capable of performing printing in cooperation with a cloud print server for providing a print service, the control method comprising:

acquiring a job list from the cloud print server;

determining, based on job information included in the acquired job list, whether the acquired job list includes a job personal identification number (PIN) code that is a valid job PIN code, wherein a valid job PIN code is code that indicates a job associated with the valid job PIN code is to be secure printed;

enabling a suspension flag to suspend printing of a job in response to determining that a valid job PIN code is included in the acquired job list and configured not to enable the suspension flag in response to determining that an invalid job PIN code is included in the acquired job list;

requesting, in a case where the suspension flag is enabled when the job list is reacquired from the cloud print server, input of a user PIN code; and controlling acquisition of the job to be secure printed due to acquisition of a valid job PIN code and printing of the job to be secure printed based on the input user PIN code.

6. A non-transitory computer-readable storage medium storing a program that causes a printer to perform the control method according to claim 5.

7. The printer according to claim 1, further comprising a registration unit configured to register printer capabilities of the printer in the cloud print server, wherein, in advance of the acquisition unit acquiring a job list from the cloud print server, the registration unit registers a capability of interpreting a job PIN code into the cloud print server.

8. The printer according to claim 7, wherein the capability of interpreting a job PIN code is configured to cause the cloud print server to provide, to a remote terminal, a print setting screen that includes an additional item to receive a job PIN code from the remote terminal and register the received job PIN Code as printer information of the printer.

9. The printer according to claim 1, wherein the acquisition unit is configured to receive an item provided separately from the job information, and wherein the determination unit further is configured to determine whether the printer has received a personal identification number (PIN) code that is a valid job PIN code based on whether the item is indicated.

10. The printer according to claim 9, wherein the item is indicated in a case where an item having an effect of enable secure printing is checked.

11. The printer according to claim 10, wherein the job PIN code is received by using a privately defined keyword.

12. The printer according to claim 1, wherein, in response to determining that the user PIN code is not a valid job PIN code, the determining unit determines that the job is to be normal printed and not to be secure printed.

13. The printer according to claim 1, wherein, prior to the suspension of a first job list that includes a valid job PIN code indicating that a first job is to be secure printed, the determining unit determines whether the first job is a suspended job.

14. The printer according to claim 13, wherein, after the acquisition unit acquires the first job list that includes the valid job PIN code indicating that the first job is to be secure printed and printing of the job associated with the valid job PIN code is suspending, the acquisition unit reacquires the first job list.

15. The printer according to claim 14, wherein, in response to determining that the suspended job is not included reacquired first job list, an ID of the suspended job is not stored.

16. The printer according to claim 14, wherein the request unit requests input of the user PIN code only after the acquisition unit reacquires the first job list.

17. The printer according to claim 1, wherein, between a suspension flag and job PIN code of each job, the printer is configured to store only the suspension flag of each job and not to store the job PIN code of each job to reduce an amount of memory use.

18. The printer according to claim 1, wherein after the acquisition unit acquires a first job list that includes a valid job PIN code indicating that the first job is to be secure printed and reacquires the first job list, the acquisition unit again reacquires the first job list.

19. The printer according to claim 1, wherein the acquisition unit configured to repeatedly acquire a first job list from the cloud print server to resolve discrepancy between the cloud print server and the printer, even if a quantity of IDs in the job ID list changes.

20. The printer according to claim 19, wherein, prior to each reacquisition of the first job list, the determination unit determines whether an acquired first job list coincides with a stored first job list to reduce network traffic, wherein the number zero represents an invalid job PIN code and a number other than the number zero represents a valid job PIN code, and wherein the printer is one of a multi-function printer or a single function printer.

* * * * *